Jan. 21, 1969    A. KRAUS ET AL    3,423,675
MEASURING SYSTEM FOR TWO AND FOUR TERMINAL NETWORKS
Filed March 10, 1965
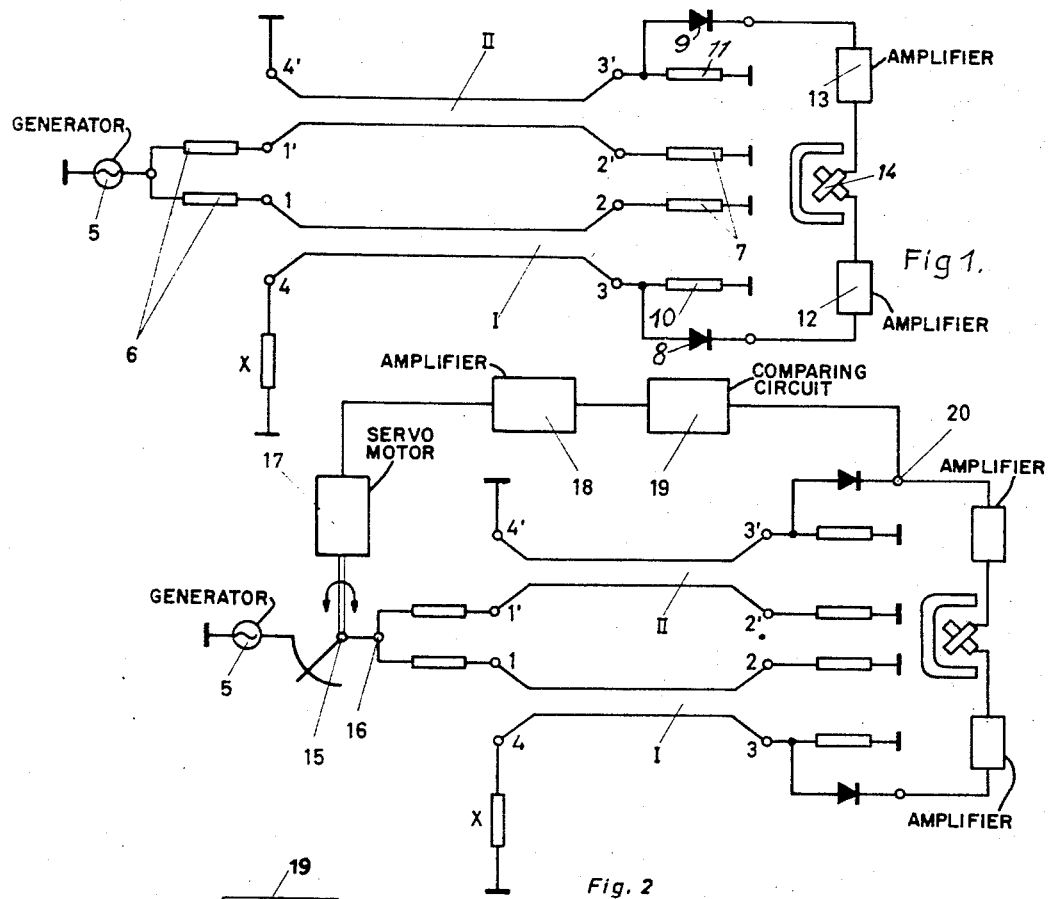
Fig 1.
Fig. 2
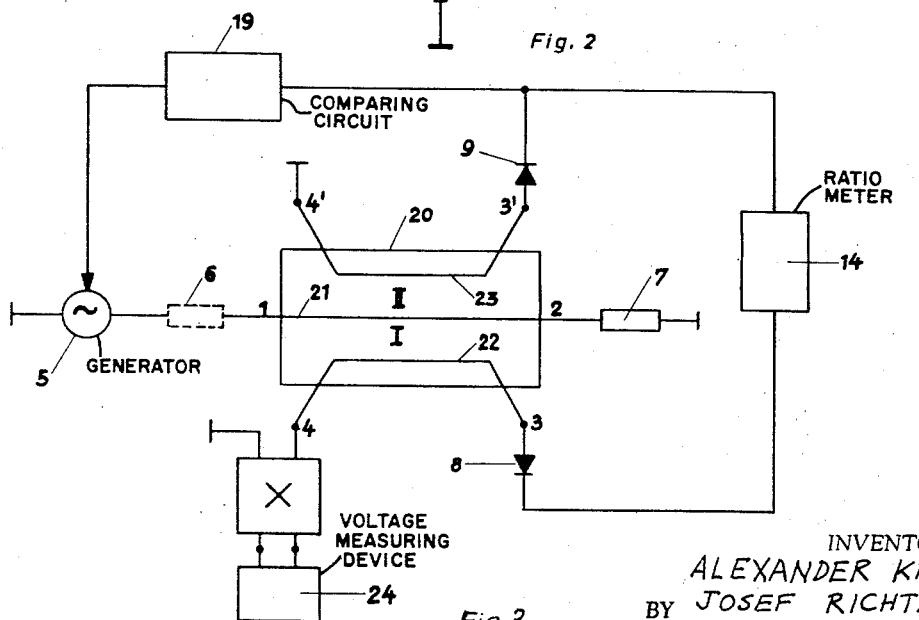
Fig. 3
INVENTORS
ALEXANDER KRAUS
BY JOSEF RICHTER
McClure & Weiser
ATTORNEYS United States Patent Office
3,423,675
Patented Jan. 21, 1969

3,423,675
MEASURING SYSTEM FOR TWO AND FOUR
TERMINAL NETWORKS
Alexander Kraus and Josef Richter, Munich, Germany,
assignors to Rohde & Schwarz, Munich, Germany, a firm
Filed Mar. 10, 1965, Ser. No. 438,608
Claims priority, application Germany, Mar. 14, 1964,
R 37,453; Apr. 8, 1964, R 37,647
U.S. Cl. 324—58                10 Claims
Int. Cl. G01r 27/06

ABSTRACT OF THE DISCLOSURE

The primary line of each of two directional couplers is fed in reflection-free manner from a signal generator. The object whose characteristics are to be measured is connected to the terminal of one secondary line nearest the generator. Detectors are connected to the terminals of both secondary lines farthest from the generator. The output of these detectors, amplified if necessary, are ratio-compared. By placing both object and detector in the secondary line, the signal levels at the detector are not subject to attenuation by the coupler relative to the signal levels applied to the object.

---

This invention relates to an arrangement for measuring the parameters of electrical two-terminal or four-terminal networks by the ratio principle with two directional couplers, each formed by first and second signal transmissive paths, hereinafter referred to as primary and secondary lines, respectively. Each primary line is fed in a reflection-free manner from a generator and those terminals of the secondary lines which are remote from the generator supply connections form the points from which the two measuring voltages for producing the ratio or quotient are derived.

Reflection measuring instruments operating according to the ratio principle are already known. Such instruments have one directional coupler for the separate measurement of the reflected wave and a second (comparison) directional coupler of similar construction for the separate measurement of the incident wave. In these known arrangements a generator is connected in a reflection-free manner to one terminal of each primary line, and the object under test is connected to the opposite terminal of one of the primary lines. The opposite terminal of the other primary line is short-circuited. The terminals of the secondary lines nearest the generator connections are terminated in a reflection-free manner. The voltages which are proportional to the magnitude of the reflected or the incident wave are then derived at the opposite terminals of the secondary lines. In this known arrangement it is further known to keep the voltage of the incident wave constant so that the magnitude of the measured reflected wave is equal to the reflection factor, i.e., to the ratio of the reflected to the incident wave.

Between the primary and secondary lines directional couplers have a relatively large attenuation, of the order of 40 db. The voltage available at the said opposite terminal of the secondary line of the one directional coupler, which is proportional to the reflection coefficient of the object under test, is therefore further reduced, in these known measuring arrangements, with respect to the measuring voltage at the object under test, by the amount of the attenuation existing between the coupled lines. The voltage which, in the known arrangements, is actually available at the last-mentioned opposite terminal is therefore lower than the voltage at the object under test by about 80 db in a case where the reflection factor is 1%, for example. In order to be able to display this voltage, very sensitive indicating equipment is therefore necessary. It is true that the measuring voltage could be increased, but this is not possible in many measuring processes, as for example, in measuring the input impedance of vacuum tubes or semiconductors. For these cases superheterodyne receivers must therefore be used as indicating devices and such reflection measuring equipment will therefore become very expensive.

It is accordingly an object of this invention to provide equipment which is free from at least some of the above-stated shortcomings of known arrangenemts.

To achieve this, and other objects which will appear, there is provided, in accordance with the invention, a measuring arrangement taking as the starting point a measuring circuit of the kind indicated, but in which the generator-fed primary lines are terminated in reflection-free manner at those connections which are remote from the generator supply points, the object under test is connected to that connection of the secondary line of the one directional coupler which is remote from the derivation point of the measuring voltage, and the connection of the secondary line of the other directional coupler which is remote from the derivation point of the measuring voltage is short-circuited. For example, two identical but mutually separate directional couplers may be provided, both of whose primary lines are fed at one connection through impedances or attenuating means from the generator, and the other connections are terminated in reflection-free manner by impedances.

In order to eliminate the two distributed impedances and terminating impedances necessary when two separate directional couplers are used, which impedances could possibly give rise to disturbing reflections, it has been found advantageous to form the two directional couplers of three signal transmissive paths or lines disposed within a common housing, of which one serves as a common generator-fed primary line terminated in reflection-free manner while the two which lie alongside it form the respective secondary lines.

With the measuring arrangement according to the invention substantially higher useful voltages can be developed than with the known arrangements and it becomes unnecessary to use expensive superheterodyne receivers and the like as indicating devices, direct indication becoming possible using simple semiconductor rectifiers connected to alternating current amplifiers.

The invention is further explained below by means of illustrative examples and with reference to diagrammatic drawings wherein FIGURE 1 shows a block diagram of a measuring arrangement according to the invention, in the embodiment of a direct-indicating reflection measuring device;

FIGURE 2 shows an alternative embodiment; and

FIGURE 3 shows an arrangement according to the invention employing a directional coupler formed by only three signal transmissive paths or lines.

FIGURE 1, to which reference may now be had, shows directional couplers I, II. The signal transmissive paths, or lines of these couplers extend between the terminals 1–2, 3–4 or 1′–2′, 3′–4′, while between the connections 1–3, 2–4, or 1′–3′, 2′–4′ there is isolation.

In the direct-indicating reflection measuring device shown in FIGURE 1 the object X under test, is connected at terminal 4 of the secondary line of directional coupler I. The generator 5 feeds the two directional couplers I and II at their terminals 1 and 1′ through two equal impedances 6. The value of these impedances 6 is chosen to be equal to the value of the characteristic impedance of the arrangement. Instead of these impedances one could in a known manner, equally well use attenuators of appropriate value, whose characteristic impedances would be chosen to be equal to the characteristic impedance of the arrangement. The connections 2 and 2' are terminated in a reflection-free manner by the two impedances 7. To the terminals 3 and 3' are connected rectifiers 8 and 9 whose input impedances correspond to the characteristic impedance of the arrangement. As the input impedance of rectifiers is ordinarily very high, impedances 10 and 11 are provided so that the input impedance of the parallel circuit is equal to the characteristic impedance of the arrangement. For amplifying the voltages appearing at the outputs 3 and 3' amplifiers 12 and 13 are provided which feed a ratio-measuring device 14.

In the measuring arrangement according to the invention shown in FIGURE 1 the voltage of the reflected wave required for indication is derived at the terminal 3 of the secondary line. Between terminal 3 and terminal 4 the directional couplers I and II have only very small attenuation so that the useful voltage in practice is as large as that reflected from the object X under test. As is known, the relationship in rectifiers between the high frequency voltage and the voltage U after rectification is a quadratic one and so it is advantageous to give the amplifiers that follow the rectifiers a linearising function. The amplification V is therefore preferably chosen to follow the relationship $$V = \frac{1}{\sqrt{U}}$$

Since rotating coil ratio measuring instruments operate reliably only over a limited range of voltages, while the voltage delivered by the generator can vary over a very wide range with changes in frequency, it is preferred to control the generator voltage with a control circuit. Such a control circuit is shown in FIGURE 2. Here the directional couplers I and II are connected as in the measuring arrangement shown in FIGURE 1. However, there is connected in addition between the generator 5 and the feeding point 16 of the directional couplers a control potentiometer 15. This potentiometer is actuated by a servo motor 17 fed through an amplifier 18. The voltage appearing at the connection 3' is fed to a comparing circuit 19. If the measuring voltage departs from the desired value the motor amplifier 18 receives a positive or negative control signal and the motor drives the potentiometer 15 in a direction such that a substantially constant voltage always appears at the point 20. If the control is performed with a large amount of lag a ratio instrument must be used. However, the control can also be performed very precisely, making possible the use of a normal moving-coil instrument for indicating the reflection. According to the invention one can obviously use another known adjusting device instead of the device 15 to 17.

According to the invention a calibrated continuously variable divider or attenuator can be connected between the output 3' of the comparing directional coupler and the following measured voltage indicator. The divider can be controlled by a control device in such a manner that the two measured voltages are equal. With 100% reflection of the object under test the divider would stand at zero attenuation and with 1% reflection it would stand at 40 db attenuation, because in the first case the reflected wave is as large as the incoming wave whereas in the second case it is only 1/100 part of the magnitude of the incoming wave. Zero attenuation of the variable divider therefore corresponds to a reflection factor of 100% and 40 db attenuation corresponds to a reflection factor of 1%. In this manner one can calibrate the divider for all reflection factors and can read the measured value from it.

FIGURE 3 illustrates the use of a double directional coupler. This comprises a housing 20 in which are disposed three signal transmissive paths, or lines, namely a central line and two adjacent lines 22 and 23. Between them these lines form two directional couplers I and II. The object X under test is again connected to the terminal 4 of line 22 of directional coupler I. To the terminals 3 and 3' are connected rectifiers 8 and 9. The connection 4' is short-circuited. The voltage of the reflected wave required for indication is derived from the terminal 3 of line 22. Between the terminals 3 and 4 the directional couplers I and II have only minimal attenuation, especially if the output attenuation of the coupler used is chosen to be greater than 8 db, so that the useful voltage in practice is as large as that reflected from the object X under test. The voltages obtained at the terminals 3 and 3' are fed to a ratio measuring device 14. The ratio could also be measured by holding constant the voltage appearing at the terminal 3' of line 23 through regulation of the generator whereby the voltage appearing at the terminal 3 is indicated directly. If the reflection is to be measured both in amplitude and in phase then the voltages from the terminals 3 and 3', after conversion of a fixed intermediate frequency, if necessary, are fed to a suitable known phase and amplitude measuring arrangement.

The generator 5 feeds the secondary line 21 at the terminal 1 either directly or with the incorporation of a matching impedance 6 if required. At the terminal 2 of this line 21 there is connected a terminating impedance 7 by which this line is terminated in reflection-free manner.

Direct-indicating reflection measuring instruments with directional couplers are generally used to measure the reflection factor of two-terminal networks. However, it is also known to measure the four-terminal attenuation of four-terminal networks with two directional couplers. For this purpose one connects one directional coupler ahead of the four-terminal network and a second beyond it and it is terminated in a reflection-free manner. The logarithmic ratio of the wave amplitudes which are fed into and emerge from the four-terminal network is then the four-terminal attenuation. Simpler measurement, which can be advantageously employed with short cables, is made possible by the instant invention by arranging that, in the range of measurement for a reflection between 0 and 1, a calibration $e^{-2a}$ is applied and connections established only to one side of network. The connection of the four-terminal network that is left free can then be open-circuited and short-circuited because in both cases it produces total reflection. The wave entering the four-terminal network in the arrangement according to the invention has the amplitude 1. In passing through the network to its output, it is diminished by the amount of the attenuation of the network, and is then reflected. On the way back it is further diminished again by the amount of the attenuation of the network, so that the reflected wave appearing at the input to the network is diminished by the amount of $e^{-2a}$ as compared with the incoming wave. Since the measuring arrangement according to the invention measures the ratio of the two waves the attenuation can be read directly on a dial.

In FIGURE 3 is shown another variant for a four-terminal network measurement. Here again, a control circuit 19 is incorporated. By appropriate procedures as, for example, by adjusting switched-in attenuation-controlling impedances or the like, the measured voltage at the output 3' of the comparing directional coupler II is established at a fixed value as indicated in this figure by direct action on the generator 5. This control circuit, which achieves the result that the power produced at the terminal 4 is always maintained at a constant value independent of frequency, makes it possible to use the measuring arrangement for measuring directly the attenuation of four-terminal networks provided that networks X is connected at one side to the terminal 4 and a suitable voltage measuring device 24 is connected at the output of the network X, for example with the interposition of an appropriate mixer or the like. If the transmission characteristic is to be measured both in amplitude and phase then here again the voltages from the terminals 3 and 3' could be fed, after conversion to a fixed intermediate frequency, if necessary, to a suitable known phase and amplitude measuring arrangement.

What is claimed is:

1. An arrangement for measuring the parameters of electrical two-terminal and four-terminal networks in accordance with the ratio principle, said arrangement comprising: directional couplers each having primary and secondary lines, each said line having a first terminal at one end of the coupler and a second terminal at the remote end of said coupler, a generator connected to the first terminal of the primary line of each coupler in a reflection-free manner, means for deriving from the second terminals of said secondary lines two measuring voltages for providing said ratio, means for terminating the second terminals of the primary lines in a reflection-free manner, means connecting an object under test to the first terminal of the secondary line of one of the directional couplers, and means short-circuiting the first terminal of the secondary line of the other directional coupler.

2. An arrangement according to claim 1 characterised in that said two directional couplers are substantially identical and in that both said primary lines are fed at their first terminals through impedances from a common generator and are terminated at their second terminals by impedances in reflection-free manner.

3. An arrangement according to claim 1 characterised in that said two directional couplers are substantially identical and in that both said primary lines are fed at their first terminals through attenuating means from a common generator and said secondary lines are terminated at their second terminals by impedances in reflection-free manner.

4. An arrangement according to claim 1 characterised in that the two directional couplers are formed by three signal transmissive paths disposed within a common housing one of which serves as a common primary line fed from the generator at the first terminal and terminated in a reflection-free manner at the second terminal, and the two adjacent ones of which serve as secondary lines.

5. An arrangement according to claim 4 characterised in that a matching impedance is connected between the generator and the primary line.

6. An arrangement according to claim 1 for use as a direct-indicating reflection measuring instrument and characterised in that the measuring voltages are fed through semiconductor rectifiers and alternating current amplifiers to a ratio-measuring device.

7. An arrangement according to claim 1 characterised in that the generator voltage is controlled by means of a control circuit in such a manner that the measuring voltage derived from the second terminal of that secondary line which is short circuited at the first terminal is constant.

8. An arrangement according to claim 1 further comprising a measuring voltage indicator supplied with the two measuring voltages, a calibrated adjustable divider connected between the other directional coupler and the indicator, and a control circuit for actuating the divider so that both measuring voltages are made equal and the ratio of the two directional coupler voltages may be read off at the divider.

9. An arrangement according to claim 1 for use in measuring the attenuation of a four-terminal network, characterised in that the network under test is connected at one terminal to the first terminal of the secondary line of the one directional coupler.

10. An arrangement according to claim 9 characterised in that the said four-terminal network is joined at its opposite terminal to a voltage measuring device.

References Cited

UNITED STATES PATENTS

| | | | |
|---|---|---|---|
| 2,562,281 | 7/1951 | Mumford | 324—58 X |
| 2,580,678 | 1/1952 | Hansen et al. | 324—58 |
| 2,588,390 | 3/1952 | Jones | 333—10 X |
| 2,650,347 | 8/1953 | Gaffney et al. | 324—58 |
| 2,679,632 | 5/1954 | Bellows | 333—10 |
| 2,775,737 | 12/1956 | Puroell | 333—10 X |
| 3,249,863 | 5/1966 | Wright | 324—58 X |

OTHER REFERENCES

Hewlett-Packard application Note 55, pp. 1–6 (1961).
Technique of Microwave Measurements, (TMM), Montgomery, Radiation Lab Series, vol. 11 (1947), pp. 894–896.

RUDOLPH V. ROLINEC, *Primary Examiner.*

P. F. WILLE, *Assistant Examiner.*

U.S. Cl. X.R.

333—10